United States Patent [19]

Rappaport

[11] 4,027,155

[45] May 31, 1977

[54] ELECTRO-OPTICAL COUNTING DEVICE FOR COUNTING PRODUCTS ARRANGED IN SHINGLE-LIKE FASHION

[76] Inventor: Edgar Rappaport, 855 Edel Ave., Maywood, N.J. 07607

[22] Filed: Aug. 13, 1975

[21] Appl. No.: 604,266

[52] U.S. Cl. ...................... 250/222 PC; 250/223 R; 250/239; 250/561

[51] Int. Cl.[2] ........................................ G01D 21/04

[58] Field of Search .......... 250/231, 237, 560, 561, 250/239, 222 PC, 223 B, 223 R

[56] References Cited

UNITED STATES PATENTS

| | | | |
|---|---|---|---|
| 3,382,368 | 5/1968 | Conner et al. | 250/561 |
| 3,414,732 | 12/1968 | Stegenga | 250/222 PC |
| 3,415,350 | 12/1968 | Murphy | 250/223 B |
| 3,508,067 | 4/1970 | Urbasch et al. | 250/222 PC |
| 3,586,866 | 6/1971 | Kawata | 250/222 PC |
| 3,882,316 | 5/1975 | Garris | 250/560 |
| 3,902,713 | 9/1975 | Von Lühmann et al. | 250/561 |

*Primary Examiner*—David C. Nelms

[57] ABSTRACT

Disclosed is an electro-optical system for counting moving articles utilizing a light emitting source and the light receiving device so arranged relative to one another that the path of light emitted by the light emitting device forms a detectable spot on the surface of the article to be counted, detectable along a fixed detection path by the light receiving device but undetectable when that spot becomes dislocated from the original position.

5 Claims, 7 Drawing Figures

ELECTRO-OPTICAL COUNTING DEVICE FOR COUNTING PRODUCTS ARRANGED IN SHINGLE-LIKE FASHION

This invention relates to a device for counting articles and more particularly to a device for counting. overlapped, shingled articles such as corrugated cardboard sheets and the like. Specifically it relates to an electro-optical detecting device capable of accurately counting overlapping articles and accurately controlling the number of articles to be stored or processed.

In the materials handling industry, it is conventional during processing to transport materials on a conveyor belt to various processing points. At these processing points, predetermined operations are designed to take place, the time and location of which are very often a function of the quantity of items or articles delivered to the site. In many of these cases, the mode of transporting the articles involves a "shingling" of one article over another such that the leading edge of a given article overlaps the trailing edge of the preceding article. This condition is frequently encountered in those industries either producing or utilizing non-rigid, flat items such as corrugated cardboard boxes, shingles, paneling, newspapers and soft cover publications and the like. For example, in the food industry where cardboard boxes are used to package goods, the boxes are frequently transported in collapsed form on a conveyor belt in overlapping juxtaposition, it becomes extremely important to have an accurate count of the number of boxes passing a given point. The subsequent operations referred to above could well require having enough boxes available to package a predetermined number of food articles arriving from a remote conveyor system; or in some cases specific numbers of boxes are required in order to complete a pallet load for example. These and a whole host of other conditions and requirements involving the necessity for accurate counts will at once suggest themselves to those skilled in this art.

Accurate counts are necessary for many reasons. In prior times, when dealing with relatively inexpensive materials, perhaps the inefficiency and waste could be tolerated. This is no longer true. Ecological problems, conditions of supply of raw materials and general overall economy of operation require implementation of cost savings whenever possible. Similarly, considerations of safety are oftentimes overriding factors in a manufacturing sequence. For example, in the illustrative setting provided above relating to packaging of food items, a dangerous condition could arise if the number of boxes supplied were insufficient to accommodate the last portion of a given product order, or quantity, resulting possibly in damage to the packaging machinery or breakage of the product itself, potentially harmful to the personnel operating the machinery.

The prior art devices, system and apparatuses heretofore available for counting purposes are usually quite satisfactory in most areas and for most applications. A wide variety of them exist varying from one another as individual cases require. In general, they can be divided into three categories, namely mechanical, electrical and electro-optical. The mechanical type of device usually involves some sort of a trip arm coupled to geared counting mechanisms. The articles to be counted generally are directed against the trip arm which becomes deflected and causes the counting mechanism to advance. When the prescribed number of counts has been reached, then the subsequent functions are performed usually manually. Thus, for example, the machine might be stopped at the appropriate count and the operator manually disposes of the articles counted. The process would be repeated as often as necessary. Unfortunately there are at least three reasons why this method is not entirely satisfactory. In the first place, being mechanical, the system is subject to unreliable operation. Problems of sticking arms, faulty gear mechanisms and the like all combine to make the mechanical system unreliable. Secondly, the system is not appropriate for use with any relatively high speed operation. The mechanical response is inherently slow, relatively speaking, and therefore unsuitable in much of modern day's technology. Thirdly, even when it does work properly, the system is only best suited for rigid and relatively uniform materials such as bottles, cans, and the like.

Thus, the tendency for any variability to occur in the article being counted must be taken into consideration. For example, a mechanical counter of the type described is not entirely suitable on a non-rigid paper-based material such as envelopes, nor where the dimensions of the article could vary to the point of missing contact with the arm. Such materials, that is materials which have a tendency to vary as to rigidity and uniformity of dimension are uniquely amenable to being counted by the present invention although it should be noted that the invention will be suitable though these tendencies do not exist, as will be described in more detail hereinbelow.

Another category of prior art counting systems utilizes solely an electrical approach. This type of system is not in widespread use and need not be explained in detail. It is sufficient to say that the method employed usually involves utilizing the article to be counted to either directly affect an electrical circuit. This gives a direct indication of the number of articles responsible for the change in electrical behavior and provides the means for a count.

The type of system most often encountered in this art, however, is the electro-optical system. In this technique a combination of a light source and a photoelectric cell is used as the means for completing an electrical circuit. Deviations in that circuit signal an event which can be the basis for some subsequent action to take place. For example, in the commonly encountered "electric eye" door opening device, a beam of light is directed across the intended path of passersby through the door and made to impinge upon a photosensitive device such as a photoelectric cell. These devices are well known in the art. The incidence of light on the cell generates a signal (via the specific properties of the cell) which may then be handled in a variety of art-known ways. When an object or person passes through the focused beam of light, the interaction of the cell and the light is altered thereby altering the output of the cell and thereby signaling an event upon which some action may be taken. In the door opening situation described here, the altered output is converted to a signal which is then processed by well known techniques and converted into the mechanical energy required to open the door. Such a system may in appropriate cases be adapted as well to serve as a counting system and indeed this is frequently encountered in the art. A modification of this system involves using a laser as a light source and directing that across a path to be traversed by the articles to be counted.

The success of a system such as this is dependent upon many factors. First, there must be available a "line of sight" path for the light source to traverse before it meets the photosensitive device. Secondly, the system generally requires rather close tolerance of dimension so that the changes induced by the interrupting article will be sensed by the device. For example, the amount of light from a large focused beam will not be sufficiently reduced by small objects passing through the beam to cause enough of a change to produce a useful signal. If one were to reduce the physical size of the beam thereby to decrease the percentage of light available for sensing after interruption then one might be certain that the particle, article or item interrupting the beam does so at precisely controlled locations relative to the physical parameters of the beam. In those industries where the article to be counted, at least in the mode in which they are counted, do not conform to rigid specifications of size, height and location. Corrugated cardboard, for example, being transported on a conveyor belt in shingled fashion is not conveyed in a precisely controlled manner; some boards may be higher than others, some leading edges may be cantilevered owing to sagging in the middle of the board, warping elsewhere, or variation in production of the item. Variables such as this make the vailable, highly sensitive systems unsuitable.

While it is to such areas that the present invention is directed, namely to counting overlapping articles, it could well be adapted to counting spaced articles as well. For example, there are many instances where articles are transported in free standing form and are spaced apart one from the other by some finite distance. In general, there is no significant problem in providing an accurate count of these materials, especially when they are rigid, firm and can otherwise withstand the force of a mechanical counting arm. Nevertheless, the present invention is eminently suited in such applications as will be seen hereinbelow.

GENERAL DESCRIPTION OF THE INVENTION

The present invention has three aspects to it in general. It is directed to a device for counting, to an apparatus which includes the counting device, and to a method for counting articles which are transported in such fashion that there is a recurring change in the spaced location of articles to be counted.

The invention utilizes electro-optical techniques and involves the detection of a change in the spaced relationship, preferably height, of articles to be counted, by means of a combination of a light emitting source and a light receiving device disposed from each other in a particular manner. Distances and angles of light incidence and detection are utilized in such a manner that a condition of electro-optical stability is obtained. A dislocation in this stability is a recordable event, is converted into an electrical signal which is detected by the system and used in a fashion consistent with the subsequent functions of the machine.

In general, the counting device of the present invention comprises a light emitting source (hereinafter LED) and a light receiving device (LRD) physically disposed from one another in such a manner that the path of light emitted by the LED will form a vertex with the line of sight of the LRD at a predetermined point, said predetermined point being located on the surface of the article to be counted when the counting device is in use, the LRD being so adapted that it will not detect the light incident upon said article unless the surface of the article substantially coincides with said predetermined point. The invention utilizes preferably a light emitting source, a light emitting diode for example, which is capable of emitting a coherent beam of light in a fine pencil-line thin form or alternatively employs a system for forming the light from the LED into a spot. While a LED which emits visible light may be employed, it is preferred to utilize one which emits light invisible to the eye. Infra-red light emitters are eminently suited for this and are preferred in practicing the invention.

The light receiving device (LRD) is one which is capable of receiving the light emitted by the LED, in the preferred aspect a photo transistor infra-red light detector. The LRD is so adapted in the device of the invention that it will only detect the spot when it falls substantially at the predetermined point above-mentioned. The point at which the detecting is not desired will ordinarily vary according to individual applications. The device of the invention may be constructed in consideration of the expected dislocations of the articles to be counted as will be seen below. The LRD can be provided with masking means to prevent detection of light from the undesired locations. The LRD is equipped with means for converting the detected light into a an electrical signal which is then processed by suitable signal processing means to enable the machine or apparatus carrying the articles to respond in some predetermined function. Such signal processing is well within the skill of the art.

DETAILED DESCRIPTION OF THE INVENTION

Figure 1:
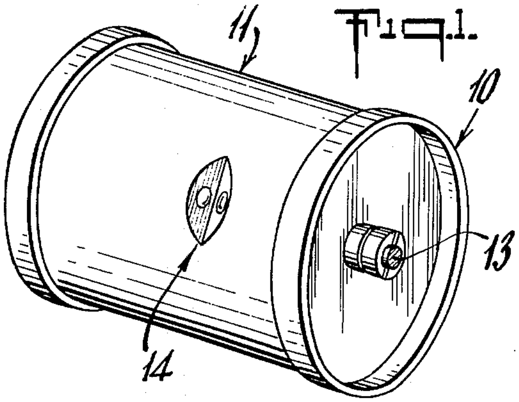
Figure 2:
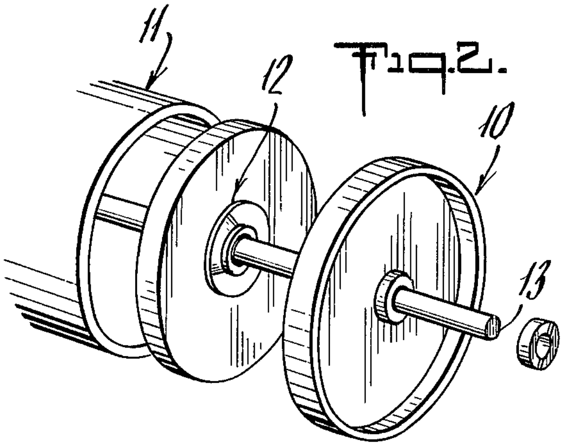
Figure 3:
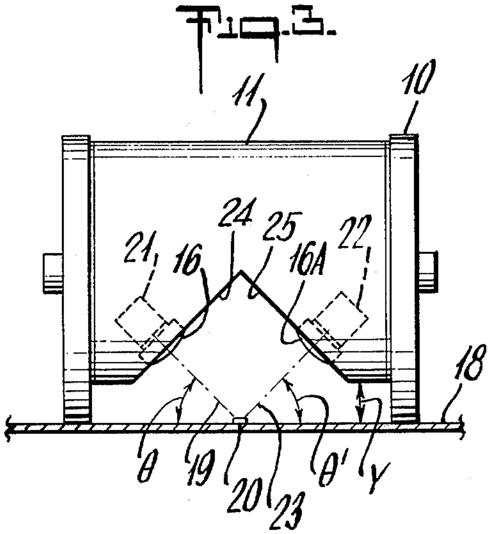
Figure 4:
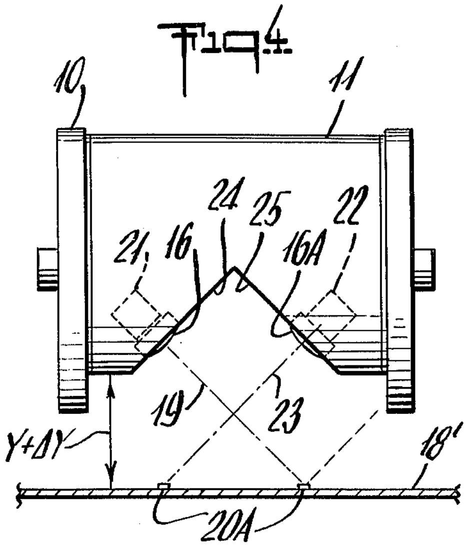
Figure 5:
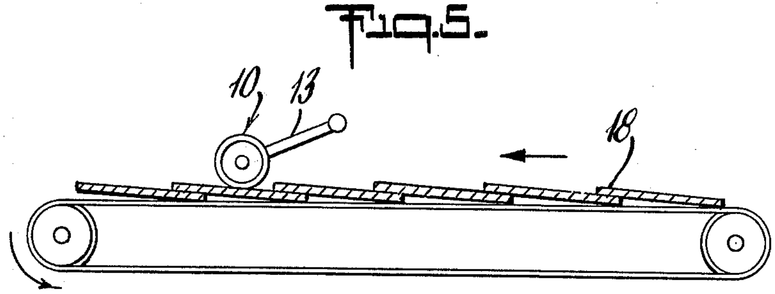
Figure 7:
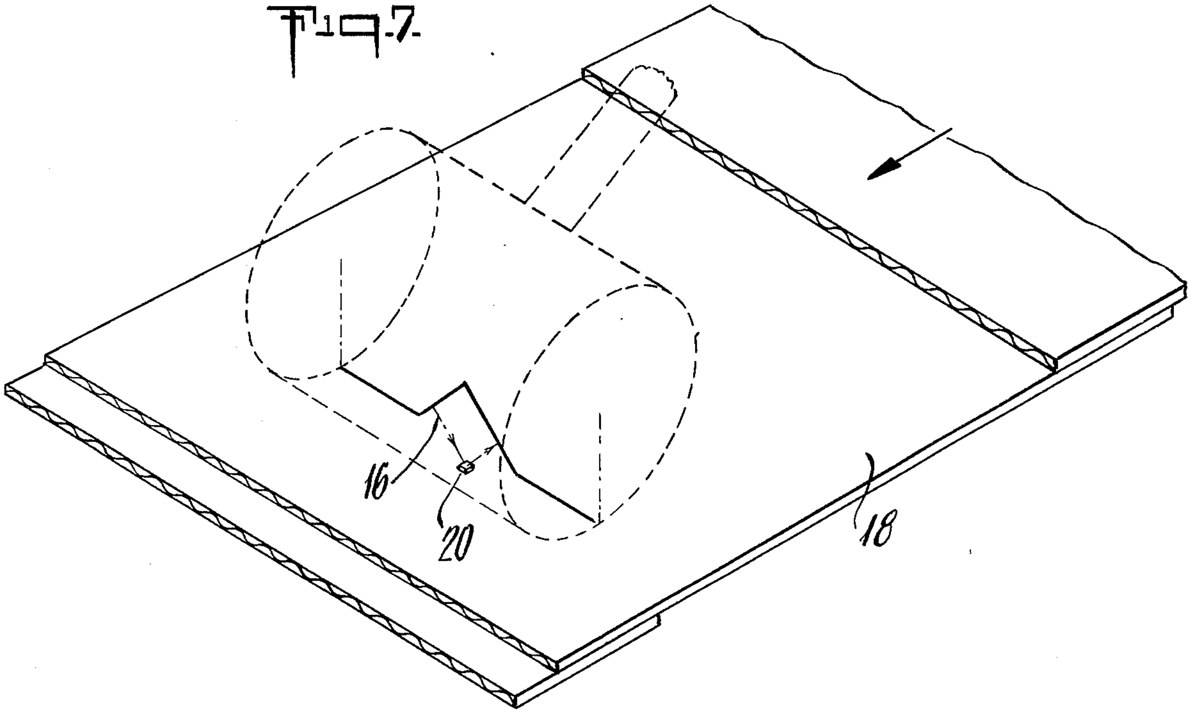
Figure 6:
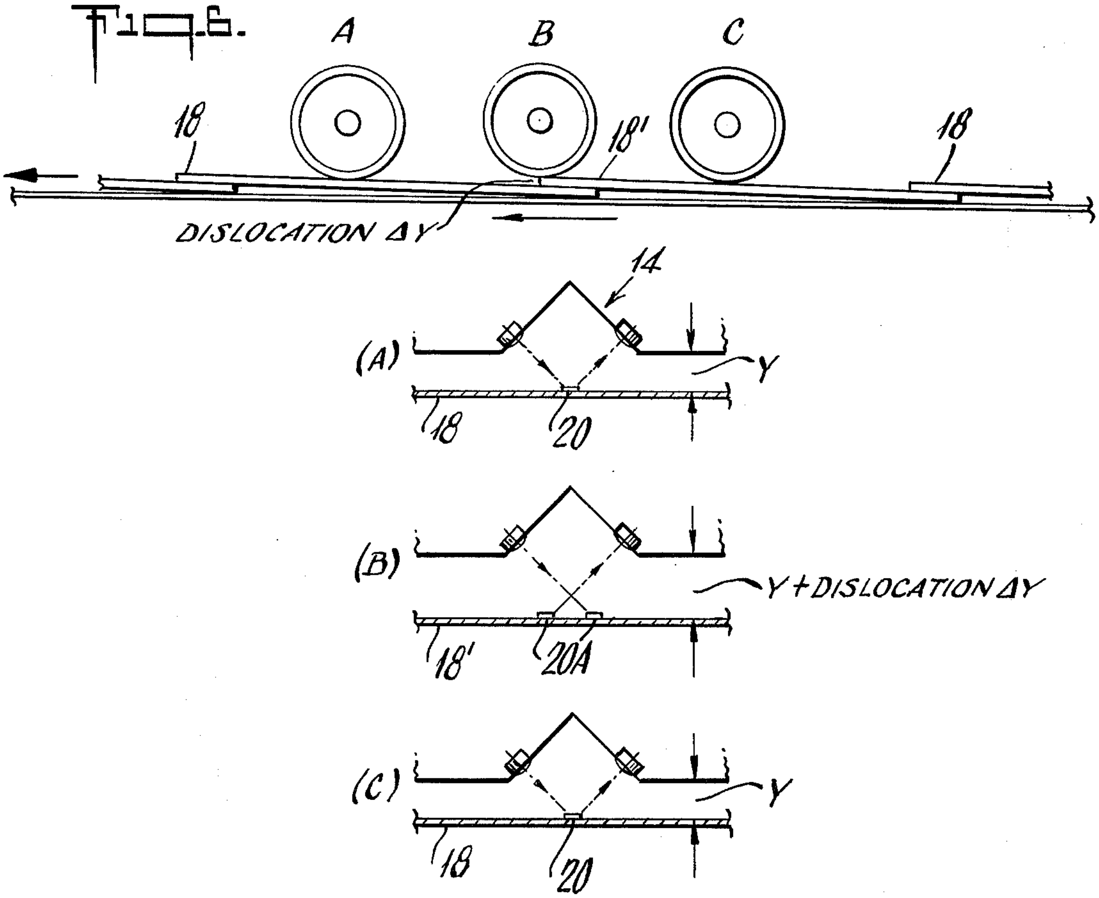

The invention will now be described with reference to the accompanying drawings wherein:

FIG. 1 is an assembled view of one embodiment of the invention, shown with "rider" wheels, FIG. 2 is an exploded partial view of FIG. 1, FIG. 3 is an out of scale view of the device of FIG. 1 in use in the electro-optically stable mode in cross section for clarity, FIG. 4 is a view of the device from FIG. 3 in the dislocated mode, FIG. 5 depicts for purposes of illustration "shingled" articles being transported on a conveyor system past the device of the invention, FIG. 6 shows the use of the device in the position of electro-optical stability and dislocation of that stability, and FIG. 7 is a 3-dimensional view of the device in operation as depicted in FIG. 5.

Referring now to FIGS. 1 and 2, there is shown generally one embodiment of the device of the present invention in assembled form (FIG. 1) and in exploded form (FIG. 2). Wheels 10 are provided on each end of body 11 and are preferably rotatably mounted thereon, though not necessarily so, via rod 13 journaled through a bearing assembly 12. Wheels 10, may be rotatably mounted in any fashion and in fact may be stationary though this is not preferred. In the embodiment shown, wheels 10 are adapted to ride on the surface of the article to be counted and therefore rotation is highly desirable. When in use wheels 10 will ride on the surface of the article to be counted and the LED/LRD combination 14 will be facing that surface as can be seen from FIG. 3. FIG. 3 is a partial cross sectional view 1—1 of one device of the invention shown riding on the surface of article to be counted 18. The direction of movement of article 18 would be perpendicular to the plane of the drawing as shown in FIG. 3.

The LED/LRD combination 14 is mounted on cylindrical body 11 and although this is shown in FIGS. 1, 2 and 3 in the form of a mounting into a cut or slice in body 11, the combination may as well be affixed on the body itself and the cut or slice dispensed with. In such a case appropriate alterations in the direction of light provided by LED and the reception thereof by LRD should be made. Body 11 is in practice hollow with LED 21 and LRD 22 being disposed within the body 11 and mounted therein by well known techniques. Windows 16 and 16A provide paths for the light beam to traverse although it should be realized that LED 21 and LRD 22 could as well be mounted to walls 24 and 25 respectively as long as the criteria set forth herein are followed, namely appropriate means, masking means for example, be used to ensure that the light spot detected by LRD 22 be along a line which forms a vertex with the light beam from LED 21 at a predetermined point and not substantially any other point.

Attached to LED 21 and LRD 22 within the hollow body 11, though not shown, are means, such as electronics needed, among other things, to power the LED, and, convert the electrical signals generated by the LED/LRD combination into mechanical responses of the machine transporting the articles. These are well known in the art and may for example stop the machine when a predetermined number of articles are counted, may palletize the number already transported past a given point, or do or be programmed to perform a myriad number of functions.

In operation, a beam of light 19 is directed from LED 21 at an angle $\theta$ onto the article to be counted 18 thereby to create on that article a spot 20 of light. If the beam is not sufficiently convergent to form a spot, a lens or reflector may be used in window 16 to focus the light. If the surface of the article 18 intersects path 19 at the predetermined point as shown in FIG. 3, then LRD 22 previously disposed at such a location and angle $\theta'$ relative to the light emitting source 21 that it will detect light only along path 23 and thus see spot 20. If the article 18 does not coincide with the vertex of paths 19 and 23 as shown in FIG. 4, then LRD 22 will not detect any light because it is prevented from seeing any light except along path 19.

In FIG. 4 however, article 18, being dislocated from the predetermined point and therefore not being substantially located at the predetermined point, will receive light at some other location remote from the sensing capability of LRD 22. The configuration of the device of the present invention that permits sensing at the vertex 20 that is, the predetermined point, and not at the substantially dislocated spot 20A is as previously stated any adaptation of LRD 22 which prevents sensing at 20A. Just how far away in actual units of measurement 20A may be from 20 will vary with the application. That is to say that the term "not substantially at the predetermined point" will define a distance within which variabilities of production such as smoothness of surface, bounce of the article and other variables not amounting to a change in count, the light spot 20 may move and still be sensed by LRD 22; and beyond which any change in the spot will be attributed to a change in count such that the light spot 20, now 20A, will not be sensed by LRD 22. This dislocation distance $\Delta Y$ may be selected by each individual fabricator but in general it has been found convenient to use dislocation amounting to one-half the diameter of the spot as suitable for preventing sensing.

Thus in FIG. 3 showing a preferred embodiment, the distance "Y" of the surface of the article 18 from the body 11 is typically 0.5 to 6 mm and preferably 1 to 2 mm. Angle $\theta$, the incident light angle is typically 30° to 90° and preferably 45°. A lens is preferably used in window 16 to focus the infra-red light from LED 21 on the surface of article 18 in a spot 20 having a diameter of generally 0.5 to 4 mm and preferably 1 to 2 mm and LRD is adapted to sense that spot 20 at the vertex of path 19 and surface 18. In the preferred embodiment this adaptation prevents LRD from sensing sufficient light from any spot 20A removed a lateral distance of one-half the diameter of spot 20, namely preferably 0.25 to 1 mm. Of course LRD may receive some light from a dislocated spot, but, in such a case the electronics of the system may prevent this from being a recordable event unless a threshold intensity is perceived.

This latter characteristic will also permit a configuration of the device in such a manner that angle $\theta$ could be 90° and LRD 22 could be mounted (coaxially) within LES 21. In this case, LRD 22 would perceive a certain intensity of light when article 18 is in position as shown in FIG. 3 and count that as a stable event. When the mode is changed to that of FIG. 4, less light would reach the LRD 22 and depending on the selection of the threshold would signal the lower intensity reception as a change in the stability and thus record the event as a change in count.

Thus, from the foregoing it may be seen that the device of the invention comprises a housing and attached thereto a combination of a light emitting source (LED) and a light receiving device (LRD) capable of detecting light along a certain detection pathway, wherein said light emitting source is adapted to direct a beam of light upon the surface of an article to be counted, said beam of light forming a vertex on said article at a predetermined position, and said light receiving device being disposed in relation to said light emitting source such that the path along which said light receiving device is capable of detecting light intersects said vertex but does not intersect a point not substantially located at said predetermined position.

There are a variety of actual embodiments that may be fashioned using the present invention and the configuration, size, angular locations of the LED and LRD, masking means, threshold of light intensity detection and the like will vary in large measure depending upon the articles to be counted, their expected thickness, the expected variation in the displacement of the article from the predetermined position and the like. The devices shown in FIGS. 1, 2 and 3 are preferred. Such a device acts as a stationary unit relative to the non-moving parts of the conveyor system transporting the articles to be counted. Stated another way the articles to be counted 18 move past the device and as the articles change in spaced relation, height for example, the device rides up and down in accordance with the level of articles. In such a mode, the device should be anchored to some part of the non-moving system via, for example arm 13 (FIGS. 5,7) though freely so as to permit wheels 10 to conform to and meet the surface of articles 18 as they change in height. It should be noted that the outside periphery of wheels 10 provide a fixed reference point in relation to the LED/LRD combination which, in fact, may constitute the predetermined point previously referred to and do so constitute in the preferred form of the invention. Alternatively, however, if wheels 10 were entirely removed and arm 13 anchored securely such that the device occupied a fixed point in space, the system would work as well. Such a mode is preferred for larger articles moving at high speed such as cans or bottles where contact between the articles and the device is not desired. It should be appreciated, however, that rotational displacement of the LED/LRD combination from the article should not be permitted to occur since this will cause erroneous readings. Reference to FIG. 6 shown out of proportion and greatly exaggerated will clarify this. Articles 18 are for example corrugated cardboard sheets transported as for example in FIG. 5. The device of the invention is depicted at position A, B, and C. Articles 18 move in the direction of the arrow past the device which is anchored as previously described. In position A, the LED/LRD combination, previously set in consideration of the size of article to be counted and other parameters previously referred to, provides an incident beam of light 19 from source 21 (see FIG. 3 for detail) intersects the plane of article 18 and creates a spot of light 20.

LRD 22, juxtaposed previously to sense spot 20, receives the energy from the light spot 20 and converts the same to an electrical signal which is processed via signal processing electronics (not shown) to record the event, namely that a single cardboard sheet is present. As article 18 passes the device, the position of the device remains unchanged except for small variations in the article with respect to optical and electrical consequences. This is then the stable mode. At this point it should be pointed out that the adaptation of the light detection path of LRD 22 is such that small variations in the linear surface of the article 18 will not alter the optical results before a new article 18' is encountered by the device. These variations, if any, in general will be less than the change shown in position B which change is to be signalled as a change in count.

In position B the device of the invention encounters a change in height ΔY at 18' relative to that of 18. As the leading edge of 18' meets the device, the latter tends to "ride" up the leading edge. Wheels 10 facilitate this. It is to be noted, however, that the LED/LRD commbination 14 remain stationary rotationally relative to 18 and 18'. As the device rides up the edge of 18', spot 20 becomes displaced ΔY from the relative position Y it occupied in position A. That is, it moves away from the intersection of light path 19 with the previously adopted detection path 23 selected for LRD 22. In such a configuration, the event defined in position A, namely that a single article 18 is present is interrupted. A signal is no longer received by LRD 22 and this condition is converted by well known electronics in a signal processing unit to a counting device or an instructional device. That is, said signals can be used to start a palletizer, for example, or perhaps shut the conveyor belt down or the like. In any event, position C defines the condition obtained if the article 18' continues to move. Position C duplicates position A in that when the device becomes situated on article 18, the conditions obtained in position A recur and stability once more obtains. Incident light beam 19 again intersects the surface of article 18 forming a vertex therewith and with the detection path 23 of LRD 22 which now again receives light from spot 20 and produces the appropriate signal.

The actual dimensions of the device will vary as previously stated depending on the particular articles being counted.

An equivalent mode of operation, and sometimes advantageous, is achieved by reversing the "stable" (A & C) and "unstable" (B) conditions. In effect, a defined optical vertex 20 would occur only during the vertical transition period B. (See FIG. 6 front views.)

What is claimed is:

1. A counting apparatus for counting articles which comprises:

a. a housing
b. attached to said housing a combination of a light emitting source and a light receiving device in which
   1. said light receiving device is adapted to detect light along a certain detection pathway, and
   2. said light emitting source is adapted to direct a beam of light along a light pathway and wherein
   3. said detection pathway and said light pathway cooperate to form a vertex at a predetermined point which coincides with the surface of an article to be counted when said counting apparatus is in use; and are so adapted relative to each other that light from the light emitting source incident upon said surface is detected by said light receiving device but is not detected when said surface is not substantially located at said vertex, and
c. means attached to said light receiving device for differentiating between the detected light and the absence of detected light and means for converting the differentiation into a recordable event, wherein said housing is a cylindrical body having two ends, a wheel rotatably mounted on each end, the circumference of each of said wheels defining a riding surface adapted to contact the surface of an article to be counted when said apparatus is in use, said riding surfaces lying in a plane which includes said vertex.

2. The counting apparatus of claim 1 wherein the light emitted by the light emitting source is infrared light.

3. The apparatus of claim 1 wherein the beam of light emitted by said light emitting source is a coherent beam.

4. The apparatus of claim 1 wherein the light emitting source has attached thereto a focusing lens whereby the beam of light emitted is focused so as to be incident on said article surface when the apparatus is in use at said predetermined point.

5. An apparatus which includes the counting apparatus of claim 1 and a conveyor assembly for transporting articles to be counted.

* * * * *